United States Patent
Sioma

(10) Patent No.: US 10,992,157 B1
(45) Date of Patent: Apr. 27, 2021

(54) BATTERY CHARGING SYSTEM THAT UTILIZES A FULL WAVE RECTIFIER AND MAINTAINS ACTIVE ERROR CORRECTION WITH A SAMPLE AND HOLD CIRCUIT

(71) Applicant: Edward M. Sioma, Newtown, PA (US)

(72) Inventor: Edward M. Sioma, Newtown, PA (US)

( * ) Notice: Subject to any disclaimer, the term of this patent is extended or adjusted under 35 U.S.C. 154(b) by 0 days.

(21) Appl. No.: 17/100,879

(22) Filed: Nov. 21, 2020

Related U.S. Application Data

(63) Continuation-in-part of application No. 16/923,081, filed on Jul. 8, 2020.

(51) Int. Cl.
*H02J 7/00* (2006.01)
*H02J 7/04* (2006.01)

(52) U.S. Cl.
CPC .... *H02J 7/007182* (2020.01); *H02J 7/00304* (2020.01); *H02J 7/04* (2013.01)

(58) Field of Classification Search
CPC .................................................. H02J 7/007182
USPC ........................................................ 320/162
See application file for complete search history.

(56) References Cited

U.S. PATENT DOCUMENTS

| | | | | |
|---|---|---|---|---|
| 5,408,170 A | * | 4/1995 | Umetsu | H02J 7/0086 320/148 |
| 5,808,443 A | | 9/1998 | Lundstrom | |
| 7,683,574 B2 | * | 3/2010 | Guang | H02J 7/0077 320/121 |
| 9,570,933 B2 | | 2/2017 | Sioma | |
| 2005/0194933 A1 | | 9/2005 | Arnold | |
| 2009/0278489 A1 | | 11/2009 | St-Jacques | |
| 2010/0148730 A1 | * | 6/2010 | Choi | H02J 7/08 320/145 |
| 2015/0229153 A1 | * | 8/2015 | Kung | H02J 7/00 320/162 |
| 2016/0204631 A1 | | 7/2016 | Houston | |
| 2016/0344198 A1 | * | 11/2016 | Sioma | H02J 7/0029 |
| 2017/0117818 A1 | * | 4/2017 | Shao | H02J 50/001 |

* cited by examiner

*Primary Examiner* — Jerry D Robbins
(74) *Attorney, Agent, or Firm* — LaMorte & Associates, P.C.

(57) ABSTRACT

A system and method for charging a battery to a threshold voltage. The battery has an output voltage that is lower than the threshold voltage when undercharged. A switch is provided that controls a current flow to the battery. The switch alternates between a closed state and an open state, wherein the current switch only connects the current source to the battery when in the closed state. A sample and hold circuit is provided that samples the output voltage of the battery each time the current switch is in its open state. This produces a saved voltage value. A comparator is used to compare the saved voltage value of the rechargeable battery to the threshold voltage. The charging current is stopped when the comparator determines that the output voltage of the rechargeable battery is at least as great as the threshold voltage.

10 Claims, 5 Drawing Sheets

BATTERY CHARGING SYSTEM THAT UTILIZES A FULL WAVE RECTIFIER AND MAINTAINS ACTIVE ERROR CORRECTION WITH A SAMPLE AND HOLD CIRCUIT

RELATED APPLICATIONS

This application is a continuation-in-part of co-pending application Ser. No. 16/923,081, filed Jul. 8, 2020.

BACKGROUND OF THE INVENTION

1. Field of the Invention

In general, the present invention relates to systems and methods used to rapidly charge a rechargeable battery. More particularly, the present invention relates to recharging systems that actively monitor battery output during a recharging cycle.

2. Prior Art Description

Rechargeable batteries come in many shapes and sizes. Small rechargeable batteries are used to power cell phones, cordless tools, and a large variety of everyday items. Large rechargeable batteries are used to power cars, trucks, boats, and the like. Racks of even larger rechargeable batteries are used to store power in electric vehicles, hybrid vehicles, commercial airliners, and many buildings that collect power using solar panels.

In order to charge a rechargeable battery, a current must be passed into the battery at a voltage that is greater than the output voltage rating of the battery. For example, in order to recharge a 12-volt battery, current must be supplied to the battery in excess of 12 volts. This voltage differential is required to ensure that electricity is flowing into the battery and not out of the battery during a recharging cycle. Determining the best charging voltage for a particular battery or series of batteries is complicated. If a battery is overcharged, it can damage the battery. The rechargeable battery may even overheat and catch fire. Battery fires due to overcharging have been reported in smartphones, laptop computers, electric vehicles, and commercial aircraft, even though these applications may use sophisticated systems to monitor the status of the rechargeable batteries.

The most common reason for batteries being overcharged is that many recharging systems are designed under the assumption that the battery and the wiring that leads to the battery have resistance values that are both low and constant. In reality, this assumption is not accurate. Rechargeable batteries are not static systems. Rather, they are dynamic systems that vary in resistance in response to many variables. For instance, the resistance of a rechargeable battery and its surrounding wiring are dependent upon the temperature of the battery, the age of the battery, the condition of the chemicals within the battery, port corrosion, internal electrode degradation, and the gauge of the wire leads.

In the prior art, battery resistance and lead resistance are assumed to be constants and a conditioned DC power source is designed in light of this assumption. The current is conditioned to a preselected charging voltage and charging current that are supplied to the rechargeable battery. The output of the battery charger is monitored using a voltage comparator. The voltage comparator compares the output voltage of the battery charger to a preselected reference voltage. For example, a rechargeable battery may be nominally rated with an output voltage of 12.2 volts. The reference voltage for the comparator may be set at 13.8 volts. Thus, when the output voltage of the battery reaches 13.8 volts, the battery is deemed fully charged and the recharging cycle is stopped.

Such a prior art recharging strategy assumes that the output voltage being received at the voltage comparator is equal to the actual voltage output being produced by the rechargeable battery. This can be a false assumption that creates significant problems. The wires that lead to and from the rechargeable battery have internal resistances. The battery itself has an internal resistance. The termination between the wires and the battery may be partially corroded and can provide significant resistance. The connections used within the recharging port may be partially corroded and can provide significant resistance. In accordance with Ohm's Law, when a current passes through a resistive element, a voltage is developed that varies as a function of the current multiplied by the value of the resistance. Consequently, the resistances of the wires, battery and contacts inflate the output voltage of the battery. The inflated voltage is read by the voltage comparator. The voltage comparator, therefore, believes that the battery is outputting more voltage than it actually is. The voltage comparator will, therefore, stop the recharging process before the battery has become fully charged.

The difference between the inflated voltage and the real voltage of the battery is the error voltage. The existence of an error voltage is often designed into the recharging system. However, the error voltage will vary with time, temperature, and battery degradation. Thus, the recharging system may overcharge the battery while attempting not to undercharge the battery. This can cause batteries to become damaged and present a fire risk.

In the prior art, battery rechargers tend to use sophisticated voltage regulators that condition the DC signal being supplied to the rechargeable battery. The voltage regulators contain smoothing capacitors and other filtering circuitry that provide a nearly constant DC signal during recharging. Such prior art is exemplified by U.S. Pat. No. 7,683,574 to Guang. The use of such voltage regulators does add to the complexity and cost of the overall recharging system. Furthermore, since the supply voltage is made nearly constant during recharging, the current is nearly constant. Consequently, the error voltage generated in the system never drops to zero. As such, the true voltage of the rechargeable battery is difficult to ascertain.

In U.S. Pat. No. 9,570,933 to Sioma, a battery recharging system is shown that actively measures the error voltage created within a recharging system. The error voltage is then used dynamically to adjust current and voltage used by the recharging system. Although such a recharging system is effective, it can be improved. The need to calculate the error voltage can be removed, if a system can be designed that can both recharge a battery and accurately measure the true output voltage of the battery during the recharging process.

A need therefore exists for an improved charging system for a rechargeable battery that can eliminate error voltages and accurately measure the voltage output of a battery, while the battery is being actively recharged. In this manner, the true voltage output of the battery can be actively monitored during recharging to achieve a full charge of the battery without overcharging the battery. This need is met by the present invention as described and claimed below.

SUMMARY OF THE INVENTION

The present invention is a system for recharging a battery to a threshold voltage, wherein said battery has an output voltage that is lower than said threshold voltage when undercharged. The system utilizes a full wave rectifier that converts an incoming AC signal to an outgoing DC signal. The outgoing DC signal is not smoothed and, therefore, has a waveform that periodically drops to zero volts.

A charging switch is provided that controls the flow of the DC signal to the battery. The charging switch alternates between a closed state and an open state, wherein the charging switch enables said current flow to reach the battery only when in its closed state. A sample and hold circuit is provided that samples the output voltage of the battery each time the charging switch is in its open state, therein producing a saved voltage value.

A comparator compares the saved voltage value of the battery to the threshold voltage, wherein the outgoing DC signal is stopped when the output voltage is at least as great as the threshold voltage. The result is a charging system that cam measure the true output voltage of a battery without any significant voltage error. The battery can therefore be fully charged without the overcharging dangers that may occur due to voltage errors in the charging system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention recharging system can be embodied in many ways to recharge a wide variety of batteries, only one embodiment has been selected for the purposes of illustration and discussion. The embodiment represents one of the best modes contemplated for utilizing the invention. The illustrated embodiment, however, is merely exemplary and should not be considered a limitation when interpreting the scope of the appended claims.

Figure 1:
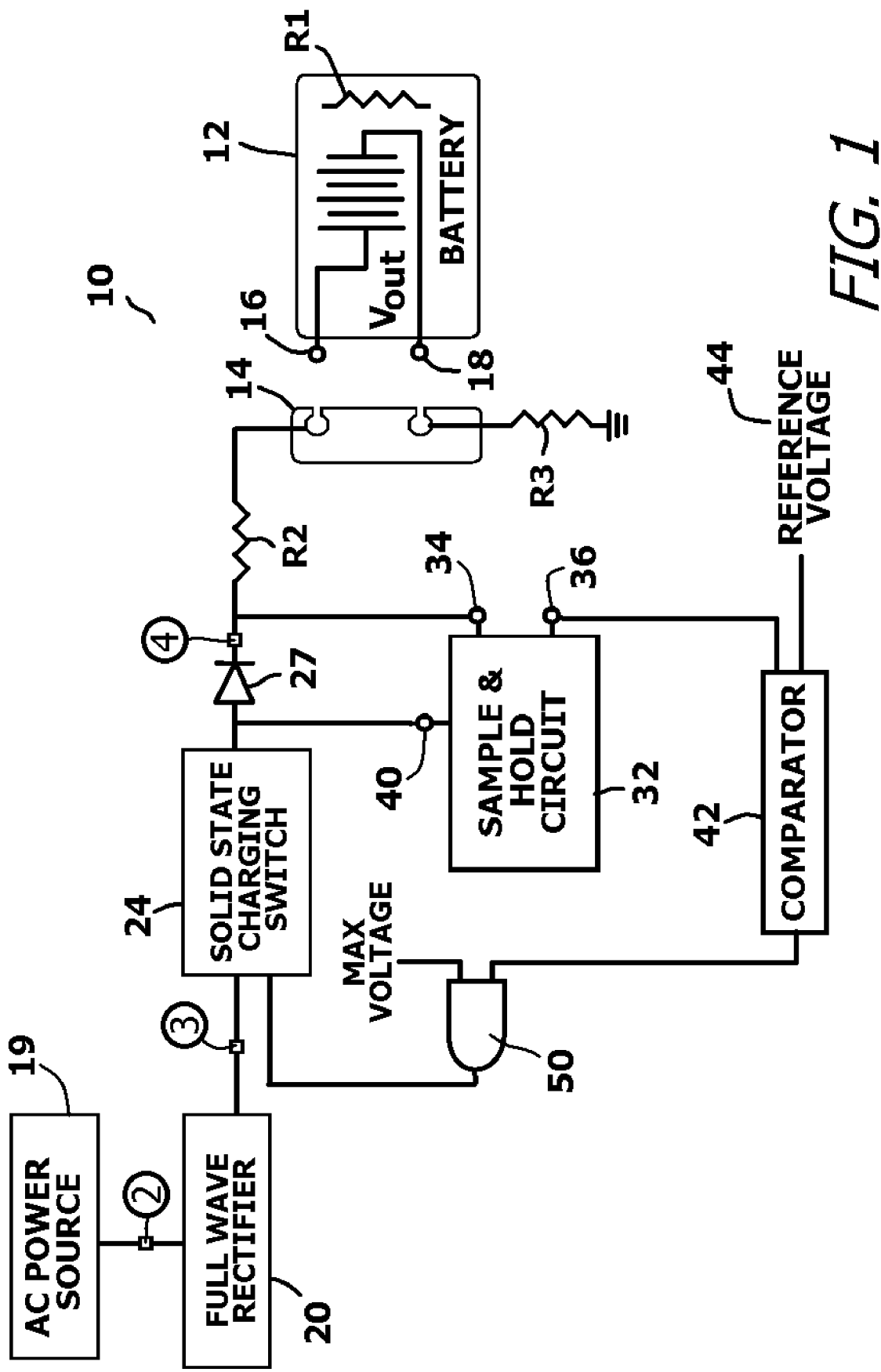
FIG. 1 is a block diagram schematic of an exemplary embodiment of the present invention recharging system.

Referring to FIG. 1, a recharging system 10 is shown that is used to recharge a rechargeable battery 12. The rechargeable battery 12 illustrated is intended to be representative of all rechargeable batteries, regardless of battery type, composition, or size. The rechargeable battery 12 has an output voltage $V_{out}$ and an internal resistance, shown as R1. The value of the output voltage $V_{out}$ and the internal resistance R1 will vary over time as the rechargeable battery 12 ages. The output voltage $V_{out}$ and the internal resistance R1 will also vary as a function of other short-term variables, such as temperature and state of charge. For the purposes of discussion and scaling waveforms, the exemplary battery 12 is assumed to be a 12-volt battery, such as that used in an automobile.

The shown recharging system 10 has a charging port 14 that can selectively interconnect with the rechargeable battery 12 when the rechargeable battery 12 needs to be recharged. It will be understood that depending upon the size of the rechargeable battery 12 and the application, the rechargeable battery 12 may be wired to the recharging system 10. In such a scenario, a separate charging port need not be provided.

Figure 2:
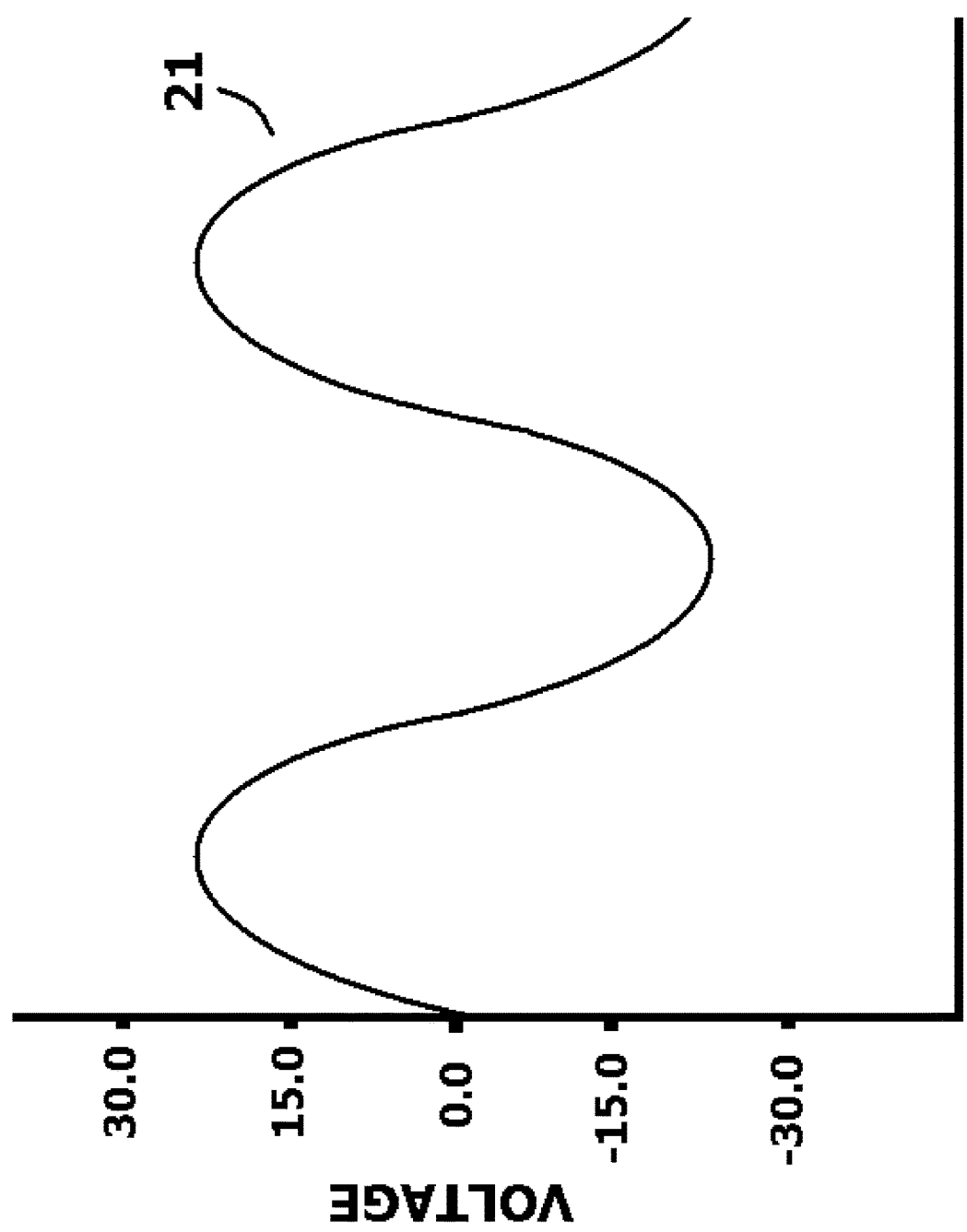
FIG. 2 shows an incoming AC signal waveform at the point identified by circle 2 in the exemplary schematic of FIG. 1.

The rechargeable battery 12 has two terminals 16, 18. The recharging system 10 connects the first terminal 16 to a power source and the second terminal 18 to ground. The power source is an AC power source 19 that produces the AC signal 21 shown in FIG. 2. By way of example, the AC power source 19 is considered to be drawn from the standard US power grid. That is, 120 volts at 60 Hz. The AC power source 19 is connected to a full wave rectifier 20. The full wave rectifier 20 does not include any smoothing capacitors or any other filtering features. Accordingly, the full wave rectifier 20 converts the AC signal 21 of FIG. 2 into the DC signal 23 shown in FIG. 3. The DC signal 23 is used to charge the rechargeable battery 12 at a selected voltage. The selected voltage is greater than the output voltage $V_{out}$ of the rechargeable battery 12, so that electricity flows into the battery 12 during a recharging cycle.

The various leads and components of the recharging system 10 between the full wave rectifier 20 and the rechargeable battery 12 have a combined resistance that are represented by the resistance value R2. Furthermore, the leads and components between the rechargeable battery 12 and ground have a combined resistance that are represented by the resistance value R3. It will therefore be understood that the total resistance of the overall recharging system 10 and the rechargeable battery 12 are equal to the sum of the resistances R1+R2+R3.

Using Ohm's Law, it will be understood that as current flows to recharge the battery 12, a voltage error is generated. The voltage error is equal to the incoming current multiplied by the combined resistance values. The true output voltage $V_{out}$ of the rechargeable battery 12 becomes inflated by the voltage error. To accurately measure the true output voltage $V_{out}$, the voltage error created by the sum of the resistances must be eliminated. In the present invention recharging system 10, this is accomplished by periodically dropping the recharging current to a value of zero while taking a simultaneous measurement of the battery's output voltage $V_{out}$. Due to Ohm's Law, when the value of the current is zero, the voltage drops and the value of the resistances become inconsequential, since there is no current to resist. As a result, no error voltage is produced and the true value for the output voltage $V_{out}$ can be directly measured.

The DC signal 23 of the full wave rectifier 20 flows through a solid state charging switch 24. The charging switch 24 operates between an open state and a closed state. In the open state, current does not pass through the charging switch 24. Conversely, in the closed state, current flows through the charging switch 24. The duration of the open state and the closed state are controlled in a manner later described.

Figure 3:
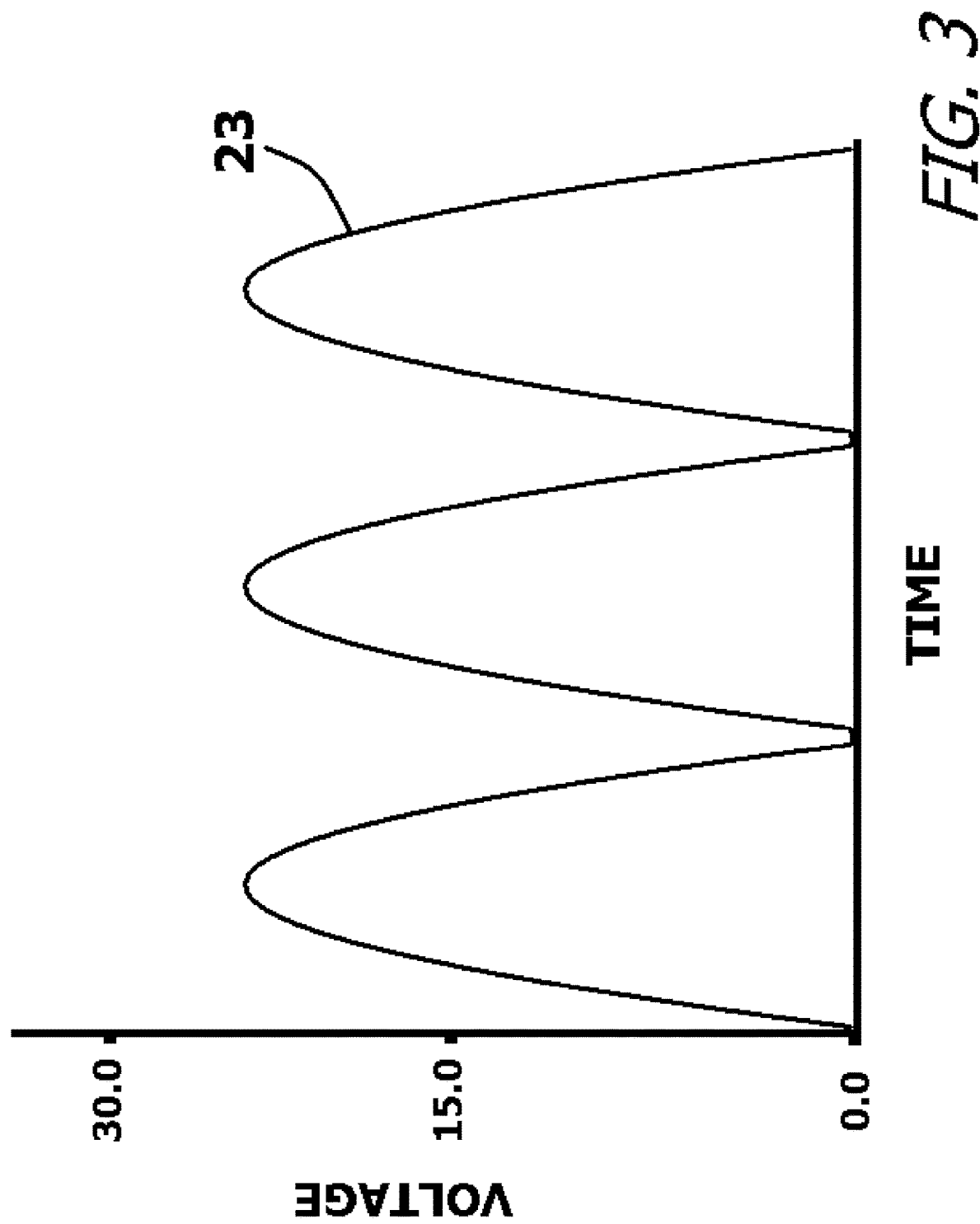
FIG. 3 shows an outgoing DC signal waveform at the point identified by circle 3 in the exemplary schematic of FIG. 1.

Referring to FIG. 3 in conjunction with FIG. 1, it can be seen that within the DC signal 23 produced by the full wave rectifier 20, there are periods 28 of the closed state, where current flows, that are significantly longer than the interposed periods 30 of the open state, where no current flows. For the DC signal 23 shown in FIG. 2, the interposed periods 30 have a duration of approximately 8.33 ms.

Figure 4:
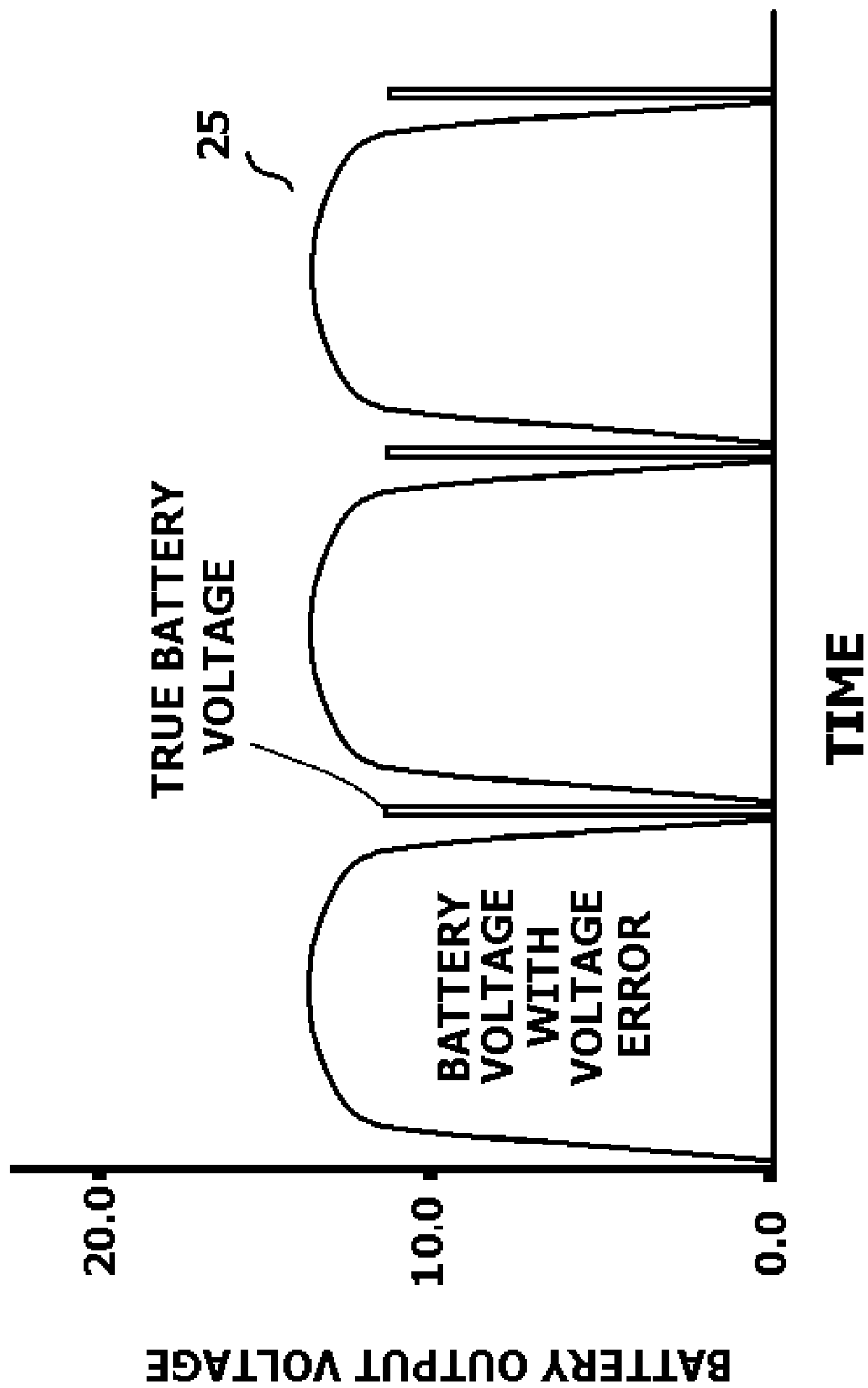
FIG. 4 shows a corrected DC signal waveform at the point identified by circle 4 in the exemplary schematic of FIG. 1.

Returning to FIG. 1, it will be understood that the DC signal 23 is directed to the charging port 14 and the rechargeable battery 12. A diode 27 or similar current flow restrictor is provided to prevent any backflow from the rechargeable battery 12 to the charging switch 24. When the charging switch 24 is in its closed state, the rechargeable battery 12 receives the current that is output by the full wave rectifier 20. The resistances inherent in the system produce an error voltage. When the error voltage is incorporated into the DC signal 23 of the full wave rectifier 20, the corrected signal 25 of FIG. 4 is created. As can be seen, when the charging switch 24 is in its open state, no current is received by the rechargeable battery 12 and no error voltage is produced.

A sample and hold circuit 32 is provided. The sample and hold circuit 32 has a voltage input 34, a voltage output 36 and a command signal terminal 40. The command signal terminal 40 receives the DC signal 23 that is shown in FIG. 3. As such, the operation of the sample and hold circuit 32 is synchronized with the DC signal 23 produced by the full wave rectifier 20.

The voltage input 34 used for the sample and hold circuit 32 is tapped from a point between the diode 27 and the rechargeable battery 12. Accordingly, the sample and hold circuit 32 receives the corrected signal 25 of FIG. 4. The sample and hold circuit 32 samples the voltage of the corrected signal 25 only when the current waveform 26 is in a period of zero current. That is, the sample and hold circuit 32 samples the corrected signal 25 only when the charging switch 24 is in its open state and no current is flowing. At such moments, the only voltage received at the voltage input 34 is the true output voltage $V_{out}$ of the rechargeable battery 12. The sample and hold circuit 32 holds the output voltage value until that value is updated the next time the charging switch 24 opens. The voltage value being held during any one cycle of the sample and hold circuit 32 is the latest output voltage $V_{out}$ of the sample and hold circuit 32.

A voltage comparator 42 is provided. The voltage comparator 42 receives the output of the sample and hold circuit 32. As such, the voltage comparator 42 receives the last measured output voltage $V_{out}$ of the rechargeable battery 12. The voltage comparator 42 compares the output of the sample and hold circuit 32 to a preselected reference voltage 44. An appropriate reference voltage is selected for the specifications of the rechargeable battery 12 being charged. If the output of the sample and hold circuit 32, i.e. the battery output voltage, is below the reference voltage 44, then the recharging operation is continued.

To prevent an overcharge event or a damaged battery from corrupting the operations of the recharging system 10, the output of the voltage comparator 42 is read to a logic circuit 50. The logic circuit 50 ensures that voltage held by the sample and hold circuit 32 does not surpass a selected maximum voltage. The output of the logic circuit 50 triggers the charging switch 24. However, when the output of the sample and hold circuit 32, i.e. the last battery output voltage, reaches the reference voltage 44, or when the output of the sample and hold circuit 32 reaches a selected maximum, the charging switch 24 stops the recharging cycle.

Figure 5:
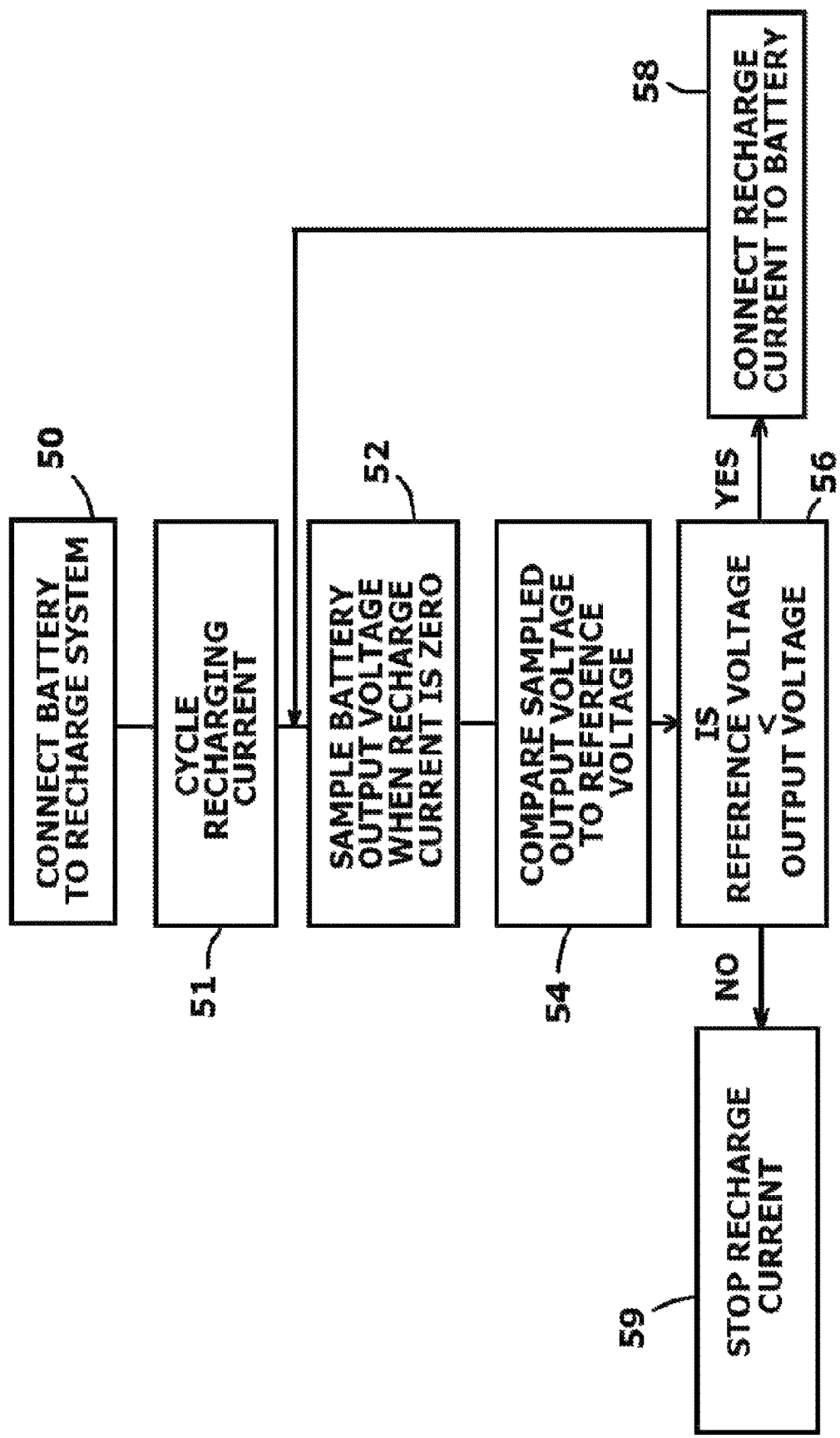
FIG. 5 shows a block diagram that outlines the operational methodology of the exemplary recharging system of FIG. 1.

Referring now to FIG. 5 in conjunction with FIG. 1 and FIG. 3, the full method of operation for the recharging system 10 can be understood. If a rechargeable battery 12 needs recharging, the rechargeable battery 12 is connected to the recharging system 10. See Block 50. The rechargeable battery 12 is supplied with a cyclic recharging current from a full wave rectifier 20. See Block 51. The true output voltage $V_{out}$ of the rechargeable battery 12 is sampled and held, using the sample and hold circuit 32. See Block 52. The sampling is conducted when the recharging current is at a zero value. The output voltage of the rechargeable battery 12 that was sampled is compared to a reference voltage 44. See Block 54. If the true output voltage is less than the reference voltage 44, then the charging switch 24 is triggered and current is supplied to the rechargeable battery 12. See Block lead 56 and Block 58.

If the output voltage of the rechargeable battery 12 is equal to, or greater than, the reference voltage 44, the charging switch 24 stops the current and the rechargeable battery 12 is considered recharged. See Block 59.

It will be understood that the embodiment of the present invention that is illustrated and described is merely exemplary and that a person skilled in the art can make many variations to the embodiment. All such embodiments are intended to be included within the scope of the present invention as defined by the claims.

What is claimed is:

1. A system for recharging a battery to a threshold voltage, wherein said battery has an output voltage that is lower than said threshold voltage when undercharged, said system comprising:
   a full wave rectifier for converting an incoming AC signal to an outgoing DC signal, wherein said outgoing DC signal periodically drops to zero volts;
   a charging switch that alternates between a closed state and an open state, wherein said charging switch enables said outgoing DC signal to flow to said battery when in said closed state and stops said outgoing DC signal when in said open state, wherein said charging switch enters said open state only when said outgoing DC signal drops to zero volts;
   a comparator that compares said output voltage of said battery to said threshold voltage only when said charging switch is in said open state and said outgoing DC signal is not being received by said battery.

2. The system according to claim 1, wherein said charging switch is maintained in said open state when said output voltage of said battery equals said threshold voltage.

3. The system according to claim 1, further including a sample and hold circuit that samples and holds said output voltage of said battery each time said charging switch is in said open state.

4. The system according to claim 3, further including a diode for preventing current flow from said battery to said charging switch.

5. The system according to claim 1, further including a charging port for selectively receiving said battery.

6. A system for recharging a battery to a threshold voltage, wherein said battery has an output voltage that is lower than said threshold voltage when undercharged, said system comprising:
   a full wave rectifier for converting an incoming AC signal to an outgoing DC signal, wherein said outgoing DC signal periodically drops to zero volts;
   a charging switch that controls flow of said outgoing DC signal to said battery, wherein said charging switch alternates between a closed state and an open state, and wherein said charging switch enables said current flow to reach said battery only when in said closed state;
   a sample and hold circuit that samples said output voltage of said battery each time said charging switch is in said open state, therein producing a saved voltage value;
   a comparator that compares said saved voltage value of said battery to said threshold voltage, wherein said current flow is stopped when said saved voltage value is at least as great as said threshold voltage.

7. The system according to claim 6, further including a diode for preventing current flow from said battery to said charging switch.

8. A method of recharging a battery to a threshold voltage, comprising:
- providing a rechargeable battery having an output voltage that is lower than said threshold voltage when undercharged;
- providing a switch that controls a current flow to said rechargeable battery;
- alternating said switch between a closed state and an open state, wherein said switch enables said current flow to reach said rechargeable battery only when in said closed state;
- comparing said output voltage of said rechargeable battery to said threshold voltage only when said switch is in said open state; and
- stopping said current flow when said output voltage is at least as great as said threshold voltage.

9. The method according to claim 8, further including providing a sample and hold circuit that samples said output voltage of said rechargeable battery only when said switch is in said open state.

10. The method according to claim 9, further including providing a diode to prevent current from said rechargeable battery from flowing into said switch.

* * * * *